US011559914B2

(12) United States Patent
Pongpairote

(10) Patent No.: US 11,559,914 B2
(45) Date of Patent: Jan. 24, 2023

(54) CUTTING APPARATUS FOR FOODSTUFFS

(71) Applicant: Frito-Lay North America, Inc., Plano, TX (US)

(72) Inventor: Chumpol Pongpairote, Leicester (GB)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 16/890,260

(22) Filed: Jun. 2, 2020

(65) Prior Publication Data

US 2022/0097246 A1     Mar. 31, 2022

(51) Int. Cl.
*B26D 1/62*     (2006.01)
*A21C 11/04*    (2006.01)

(52) U.S. Cl.
CPC .............. *B26D 1/626* (2013.01); *A21C 11/04* (2013.01); *B26D 2210/02* (2013.01); *Y10S 83/932* (2013.01); *Y10T 83/9408* (2015.04)

(58) Field of Classification Search
CPC ............ Y10T 83/9408; Y10T 83/9416; Y10T 83/9418; Y10T 83/9423; Y10T 83/9428; Y10T 83/9444; Y10T 83/9447; Y10S 83/932; B26D 1/626; B26D 7/18; B26D 2210/02; B26D 2210/11; B26D 1/62; B26F 1/02; B26F 1/10; B26F 1/14; B26F 1/32; B26F 1/3806; B26F 1/386; B26F 1/44; A21C 11/04; A21C 11/004; A21C 11/006; A21C 11/008; A21C 11/02; A21C 11/08; A21C 11/10; A21C 11/103
See application file for complete search history.

(56) References Cited

U.S. PATENT DOCUMENTS

| | | | | |
|---|---|---|---|---|
| 1,945,755 A | * | 2/1934 | Seruggs, Jr. | A21C 11/10 83/426 |
| 3,024,112 A | * | 3/1962 | Burgess | A21C 11/08 426/497 |
| D213,574 S | | 3/1969 | Kuchuris | |
| 4,607,553 A | * | 8/1986 | Hartzell | B26D 7/18 83/164 |
| 4,608,918 A | * | 9/1986 | Funabashi | B26D 7/34 99/450.6 |
| 5,162,119 A | | 11/1992 | Pappas et al. | |
| D383,886 S | | 9/1997 | Baumgartner | |

(Continued)

FOREIGN PATENT DOCUMENTS

| | | |
|---|---|---|
| DE | 202015104796 | 9/2015 |
| EP | 0541834 | 5/1993 |
| FR | 2406390 | 5/1979 |

OTHER PUBLICATIONS

International Search Report and Written Opinion dated Sep. 21, 2021, in PCT/US2021/035158.

*Primary Examiner* — Phong H Nguyen
(74) *Attorney, Agent, or Firm* — Barnes & Thornburg LLP; G. Peter Nichols

(57) ABSTRACT

An apparatus includes a cutting surface that contains at least one cutting element having a top. The cutting element also has an interior sidewall extending from the cutting surface to the top with an interior sidewall angle, an exterior sidewall extending from the cutting surface to the top with an exterior sidewall angle and a shoulder provided on the interior sidewall between the base and the top. The interior sidewall angle is different than the exterior sidewall angle.

13 Claims, 4 Drawing Sheets

(56) References Cited

U.S. PATENT DOCUMENTS

| | | |
|---|---|---|
| D391,125 S | 2/1998 | Morales |
| 6,408,729 B1 * | 6/2002 | Johnson ................... B26D 7/18 |
| | | 83/164 |
| 7,678,034 B2 | 3/2010 | Wilhelm |
| D630,040 S | 1/2011 | Suski et al. |
| 8,512,782 B2 | 8/2013 | Akamittath et al. |
| D697,769 S | 1/2014 | Lion et al. |
| 8,622,730 B2 * | 1/2014 | Suski ..................... A21C 11/10 |
| | | 425/294 |
| 8,647,104 B1 * | 2/2014 | Tillman ............... A21C 11/106 |
| | | 425/294 |
| D722,822 S | 2/2015 | Huber et al. |
| D728,322 S | 5/2015 | Suski et al. |
| D730,704 S | 6/2015 | Repac |
| 9,198,438 B2 | 12/2015 | Suski et al. |
| 9,731,857 B2 * | 8/2017 | Miyajima ................. B26F 1/02 |
| D807,932 S | 1/2018 | Frank et al. |
| 9,999,231 B2 | 6/2018 | Rettey et al. |
| D824,716 S | 8/2018 | Elgamil et al. |
| D844,394 S | 4/2019 | Arendt |
| D869,250 S | 12/2019 | Arendt |
| D880,259 S | 4/2020 | Zhang |
| D882,355 S | 4/2020 | Sueferer |
| 2002/0092180 A1 * | 7/2002 | Tomasulo ............ A21C 11/106 |
| | | 30/316 |
| 2011/0011230 A1 * | 1/2011 | Bergander ................ B26F 1/10 |
| | | 83/347 |
| 2014/0260847 A1 * | 9/2014 | Schneider ............ A21C 11/106 |
| | | 83/19 |

* cited by examiner

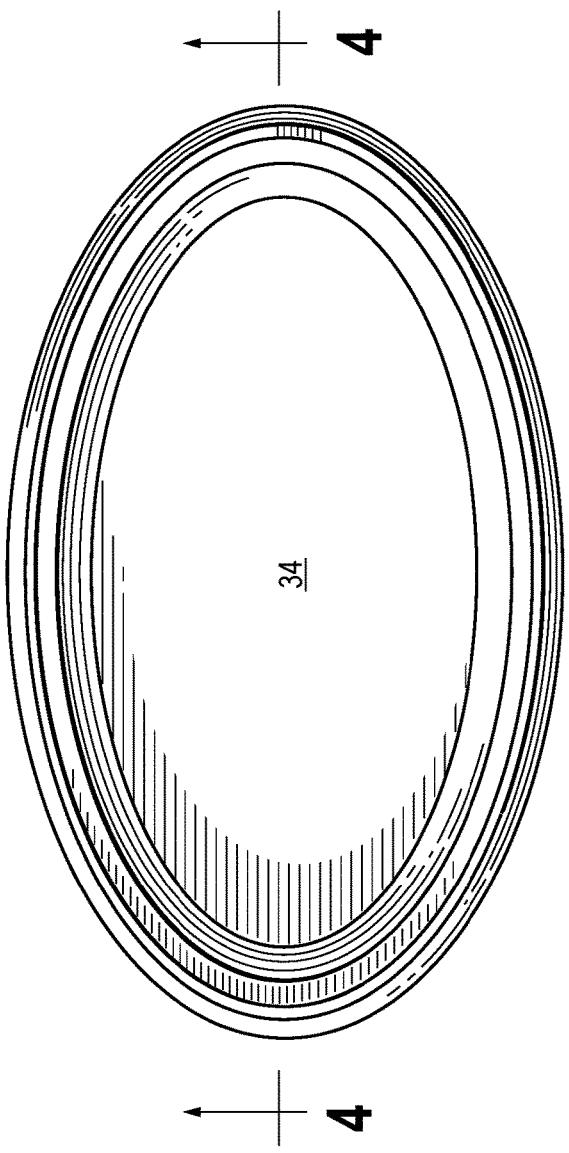

CUTTING APPARATUS FOR FOODSTUFFS

The present disclosure describes an cutting apparatus suitable to create a plurality of uniformly shaped dough products.

BACKGROUND

In making dough products, it is known to form dough into a sheet between a pair of counter rotating sheeter rollers, stripping the dough from the back roller (e.g. with a wire) so that it adheres only to the front roller, and then cutting a pattern from the sheet by rotating a so-called cutter roller against the surface of the front roller.

The patterned sheet is then stripped from the front roller (e.g. with a wire), with the product pieces falling down onto a conveyor belt, and with the surrounding web of "rework" dough, if any, returning to the hopper above the two sheeter rollers to be recombined fresh dough or directing the rework to waste.

There is an ongoing need to reduce waste. Therefore, it would be desirable to provide a cutting roller that can efficiently cut the desired pattern while minimizing the amount of waste.

SUMMARY

In one aspect, an apparatus is configured with a cutting surface that contains at least one cutting element having a top with a flat surface. The cutting element also has an interior sidewall extending from a base to the top with an interior sidewall angle, an exterior sidewall extending from a base to the top with an exterior sidewall angle. The interior sidewall angle is different than the exterior sidewall angle. The apparatus may comprise a roll with the cutting surface provided on an outer peripheral surface of the roll.

In one embodiment, the interior sidewall angle is greater than the exterior sidewall angle by about 5° or more. In some instances, the interior sidewall angle is at least 20° or more. Alternatively or additionally, the exterior sidewall angle is about 20° or less.

A shoulder is provided on the interior sidewall between the base of the cutting element and the top of the cutting element. The shoulder has a base and a sidewall that extends from the shoulder base to the top of the cutting element at a shoulder sidewall angle. In one embodiment, the interior sidewall angle is greater than the shoulder sidewall angle by about 5° degrees or more. In some instances, the interior sidewall angle is at least 20° or more. Alternatively or additionally, the shoulder sidewall angle is about 20° or less.

Typically, the shoulder base has a width that is greater than a width of the top flat surface and in some instances, the width of the shoulder is about 1.5 times or greater than the width of the top flat surface. In some embodiments, the shoulder has a height measured from a shoulder base to the top flat surface that is less than a height of the top flat surface measured from the top flat surface to the cutting surface. In these instances, the shoulder height may be between about 20% to about 40% of the height of the top surface.

In one aspect the exterior sidewall and shoulder sidewall define a cutting angle such that the cutting angle is less than the interior side wall angle and, in some instances is about 5° less.

The cutting element may have any suitable shape such as a parallelogram, circle, oval, ellipse, or a complex geometrical shape. In one embodiment the at least one cutting element is an ellipse and, it is contemplated that all the cutting elements are elliptical. In those instances, where the cutting element is elliptical, each ellipse has a major axis that is between about 1.5 to about 2.0 times longer than a minor axis.

It is also contemplated that the size of the cutting elements may be the same or different and in one embodiment, all the cutting elements have a size that is equal.

Where the apparatus includes a plurality of cutting elements, each cutting element may be spaced from adjacent cutting elements. Alternatively, the cutting elements may be arranged such that a portion of the exterior sidewall of one of the plurality of cutting elements touches a portion of the exterior sidewall of an adjacent one of the plurality of cutting elements. In other embodiments, the cutting elements may be arranged such that a portion of the exterior sidewall of one of the plurality of cutting elements touches a portion of the exterior sidewall of at least four adjacent one of the plurality of cutting elements. In yet other embodiments, the cutting elements may be arranged such that a portion of the exterior sidewall of one of the plurality of cutting elements touches a portion of the exterior sidewall of six adjacent one of the plurality of cutting elements.

By controlling the geometry of the cutting elements and the pattern of the cutting elements on the cutting surface, it has been found that the amount of waste can be reduced while efficiently cutting the dough to provide a plurality of similarly shaped foodstuffs. For example, where the cutting elements are elliptical, the cutting elements may be arranged in alternating rows such that the ends of the major axis of each cutting element in one row are approximately at the center point of the cutting elements in the adjacent row. As a result, a gap is created that has a generally triangular shape with curvilinear sides. In some aspects the volume of the gap is at least 30 times less than the volume of each cutting element.

DESCRIPTION OF THE DRAWINGS

The above aspects and other features, aspects, and advantages of the described apparatus may be better understood with regard to the following description, appended claims, and accompanying drawings.

FIG. 3 is a top view of a single cutting element.

FIG. 4 is a cross-sectional view taken along line 3-3 and illustrating a single cutting element.

DESCRIPTION

It is to be understood by one of ordinary skill in the art that the present discussion is a description of specific embodiments only and is not intended to limit the broader aspects of the described apparatus.

Figure 1:
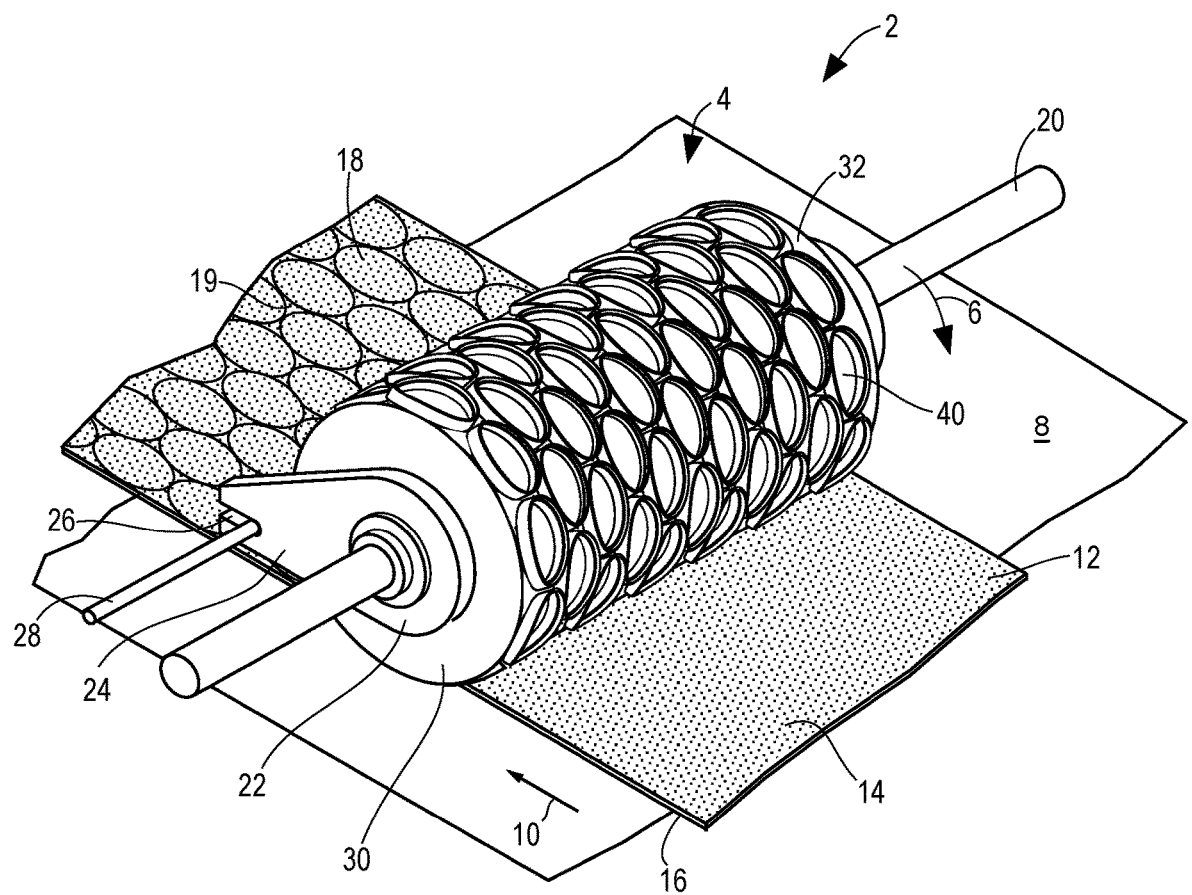
FIG. 1, is a perspective view of a cutting apparatus according to the present disclosure.

Turning to FIG. 1, a product assembly line 2 incorporating a cutting apparatus 4 is depicted. The product assembly 2 line has a sheet of dough 12 with a first surface 14 and a second surface 16 traveling from right to left upon a conveyor 8 that is moving in the direction shown by arrow 10. Although not shown, it should be understood that the dough is formed in a batch maker or the like and transferred to the product assembly line 2 where it is processed into a dough sheet 12. As shown in this portion of the product assembly line 2, the sheet of dough 12 is delivered by conveyor 8 to the cutting apparatus 4. As the dough sheet moves in a feed direction (indicated by the arrow 10), the cutting apparatus 4 rotates in the direction indicated by the arrow 6.

The cutting apparatus 4 includes at least one and, typically a plurality, of cutting patterns, molds, or elements 40 disposed on an exterior or cutting surface 32 of a cylindrical, rotatably driven drum 30 for forming and cutting the dough sheet 12 into a desired number of uniform shaped pieces 18. The plurality of cutting elements 40 are mounted relative to the conveyor 8 such that, when the dough sheet 12 is traveling in the feed direction 10, the cutting elements 40 engage the dough sheet 12 to cut and sever the dough to provide a plurality of cuts in the dough sheet, resulting in the formation of individual dough pieces or products 18 and intermediate, recyclable dough pieces 19. The drum 30 can be positively driven or driven by the frictional engagement between the cutting elements 40 and the dough sheet 12 or the conveyor 8. In operation, the cutting elements 40 extend all the way through the dough sheet 12 to lightly engage the conveyor 8 and completely sever the dough sheet 12.

It will be understood that the dough sheet 12 can have any suitable thickness, with, of course, a corresponding change in the size (height or depth) of the cutting elements 40, in order to form products 18 of varying depth or thickness. After the cuts are made in the dough sheet 12, the cut pieces 18 continue traveling on the conveyor 8 to a post processing station (not shown). The post processing station can include, for example, proofing, baking, freezing and/or packaging.

In other embodiments, it is contemplated that the cutting elements 40 are provided on a surface of a pressing element instead of a rotating drum such that the pressing element intermittently contacts a portion of a dough sheet to cut the dough sheet into a desired number of uniform shaped pieces.

In one aspect, the rotating drum 30 may be mounted on a drive shaft 20. Side plates 22 (only one of which is shown) may be mounted on either side of the rotating drum 30. The side plates 22 may each include an elongated side end portion 24, respectively, that extend in the direction of travel 10 of the dough sheet. Each elongated side end portions 24 includes a notch 26 to receive a pivot shaft 28 that extends parallel to the drive shaft 20. The pivot shaft 28 allows the rotating drum 30 and the drive shaft 20 to pivot and lift up off of the dough sheet 12 when desired, such as at the end of a production cycle. A dough roller (not shown) may be freely rotatably mounted on the pivot shaft 28.

It will be appreciated that a plurality of the cutting elements 40 are disposed on the exterior of the rotating drum 30 to define a cutting surface 32. The cutting elements 40 may be disposed or provided on the exterior surface in any suitable manner. In one embodiment, the various cutting elements 40 are provided as part of a sleeve that extends about exterior surface and is secured for rotation with the drum 30. Alternatively, the cutting elements 40 may be provided directly on exterior surface by any suitable means depending on the material forming the cutting elements. For example, the cutting elements 40 may be provided by engraving, laser etching, or the like. It is contemplated that various suitable materials could be used for the cutting elements 40 such as metals, plastics, coated metals, and the like. As an example, the cutting elements could be formed from a metal such as stainless steel coated with polytetrafluoroethylene.

Figure 2:
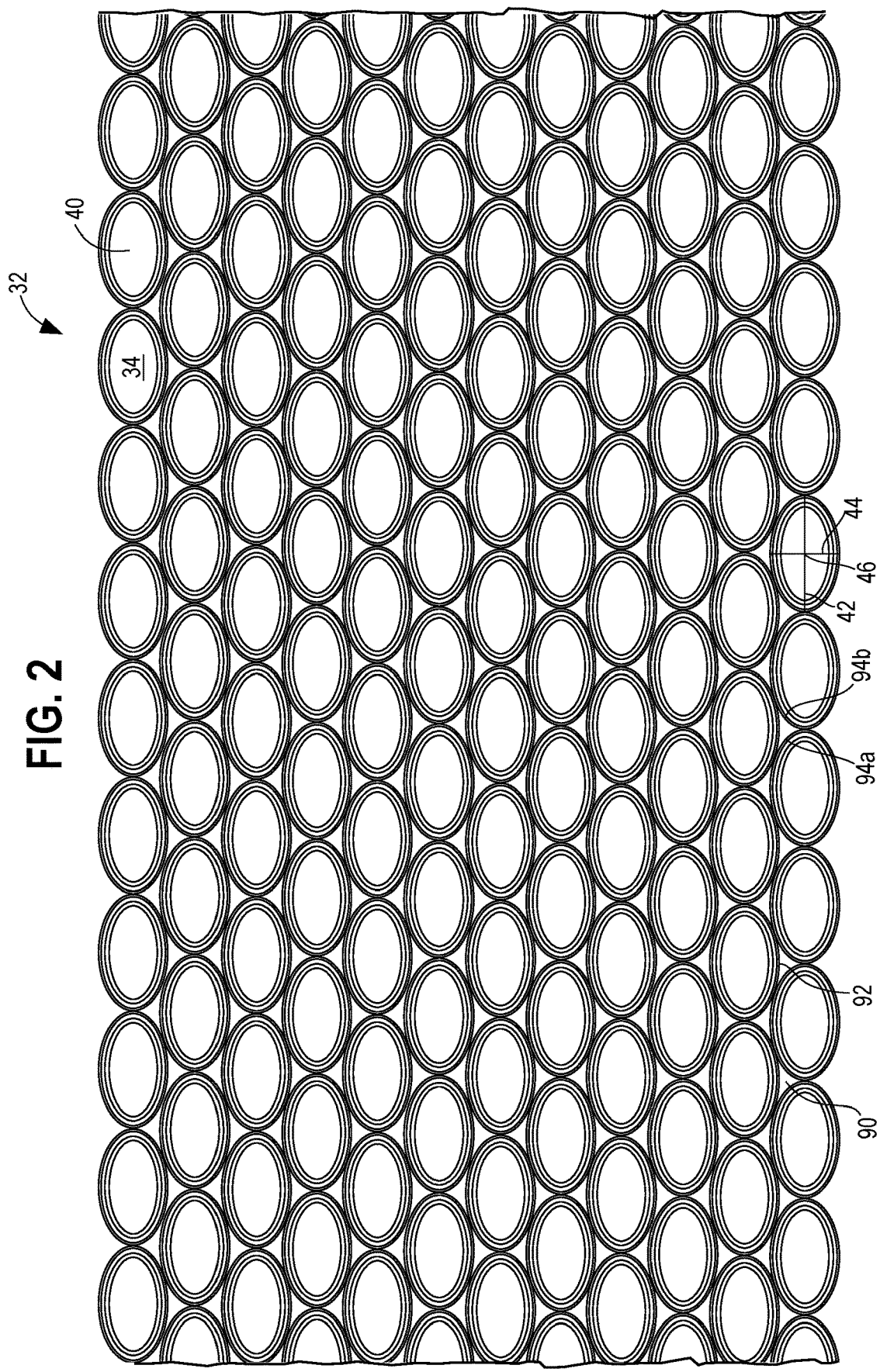
FIG. 2 is a plan view of a portion of the cutting pattern or cutting surface with a plurality of cutting elements which is provided on the rotating drum of the cutting apparatus.

Referring to FIG. 2, a plan view of a portion of the cutting pattern or cutting surface 32 provided on the rotating drum 30 to form the cutting apparatus 4 is shown. It will be appreciated that the cutting pattern or cutting surface 32 has dimensions suitable to completely cover or encircle the drum 30. It will be appreciated that the cutting surface 32 contains a plurality of cutting elements 40 each of which have the same or substantially the same shape.

Each cutting element 40 may have any suitable shape such as a parallelogram, circle, oval, ellipse, or a complex geometrical shape generally defined by its exterior sidewall 50 (shown in FIG. 4). In one embodiment as best seen in FIG. 3, the cutting elements 40 are elliptical and, it is contemplated that all the cutting elements 40 are elliptical. In those instances where the cutting element 40 is elliptical, each ellipse has a major axis 42 and a minor axis 44 such that their intersection defines the center or center point 46.

The length of the major axis 42 is from about 10 mm to about 50 mm or about 15 mm to about 40 mm, or about 20 mm to about 30 mm and may be about 20 mm to about 25 mm of about 23 mm. The length of the minor axis is from about 2 mm to about 25 mm, or about 5 mm to about 20 mm, or about 9 mm to about 15 mm, or about 13 mm. In some aspects, the major axis is about 1.5 to about 2.0 times longer than the length of the minor axis 44. The lengths of the major axis 42 and the minor axis 44 are measured as the distance from each of the respective exterior side walls 50.

Referring back to FIG. 2, where the cutting elements 40 are shown as elliptical, the cutting elements 40 may be arranged in alternating rows such that the ends of the major axis 42 of each cutting element 40 in one row are approximately at the center point 46 of the cutting elements 40 in the adjacent row. It will also be appreciated that the plurality of cutting elements 40 may be arranged such that a portion of the exterior sidewall 50 of one of the plurality of cutting elements 40 touches a portion of the exterior sidewall 50 of an adjacent one of the plurality of cutting elements 40. In other embodiments, the cutting elements 40 may be arranged such that a portion of the exterior sidewall 50 of one of the plurality of cutting elements 40 touches a portion of the exterior sidewall 50 of at least four adjacent one of the plurality of cutting elements 40. In yet other embodiments, the cutting elements 40 may be arranged such that a portion of the exterior sidewall 50 of one of the plurality of cutting elements 40 touches a portion of the exterior sidewall 40 of six adjacent one of the plurality of cutting elements 40.

It will also be appreciated that by arranging the cutting elements 40 in a manner so that a portion of the exterior sidewall 50 of one of the plurality of cutting elements 40 touches a portion of the exterior sidewall 50 of adjacent one of the plurality of cutting elements 40, interstitial gaps 90 are created. In some instances, the interstitial gaps 90 are generally triangular shaped with curvilinear (concave) sides. In some aspects the volume of the interstitial gap 90 is at least 30 times less than the volume of each cutting element 40.

In those instances where the cutting elements 40 are elliptical and the cutting elements are arranged so that a portion of the exterior sidewall 50 of one of the plurality of cutting elements 40 touches a portion of the exterior sidewall 50 of at least two adjacent cutting elements, two of the sides 94a, 94b may have generally the same length and one of the sides 92 may be longer than the other two sides. The two sides 94a, 94b, which are shorter, may have a length from about 1 mm to about 6 mm, or about 2 mm to about 5 mm, or about 3 mm. The long side 92 may have a length from about 2 mm to about 8 mm, or about 3 mm to about 6 mm, or about 4 mm. By arranging the cutting elements 40 in an appropriate manner, the size or volume of the interstitial gaps 90 are small, which reduces the amount of waste (or recyclable) pieces 19.

It is also contemplated that, in some embodiments, each cutting element 40 may be spaced from adjacent cutting elements 40. In other words, in this instance, each cutting element 40 does not touch another cutting element 40 and there is a gap between each adjacent cutting element 40.

Figure 5:
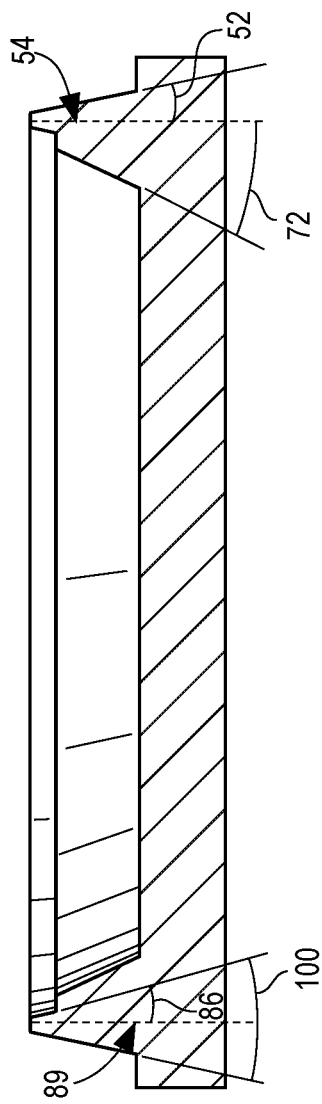
FIG. 5 is the same cross sectional view as FIG. 5 and is provided to better illustrate features of the cutting element.

Turning now to FIGS. 4 and 5, a cross-sectional view of a single cutting element 40 is depicted. Each cutting element 40 has a top 60 that has a flat surface 62 with a width 64. The width 64 of the top refers 62 to the width at the top of the cutting element 40 (and may be considered the thickness of the cutting element). The width 64 of the top ranges from about 0.2 to about 0.6 mm, or about 0.3 mm to about 0.5 mm, or about 0.4 mm.

The top surface 62 is at a cutting element height or cutting depth 66, which is the distance between the top surface 62 and the top of the cutting surface 34. The cutting element height of cutting depth 66 may differ depending on the thickness of the dough. In one instance, when the dough has a thickness of approximately 1.8 mm to about 2.4 mm, the element height (or cutting depth) 66 may be in the range of about 3.0 mm to about 4.0 mm, or about 3.5 mm.

Each cutting element 40 has an interior sidewall 70 and an exterior sidewall 50. The interior sidewall 70 extends from the top of the cutting surface 34 toward the top surface 62 at an interior sidewall angle 72. The exterior sidewall 50 extends from the top of the cutting surface 34 to the top surface 62 at an exterior sidewall angle 52. As best seen in FIG. 5, the interior 72 and exterior 52 sidewall angles refer to the angle of the sidewalls with respect to an imaginary line 54 that is normal to the top of the cutting surface 34. The interior sidewall angle 72 is also referred to as a release angle which is relevant to the cutting of dough. It is desirable that the interior sidewall angle 72 be larger than both the exterior sidewall angle 52 and the cutting angle, which will be defined in more detail below so that the cutting elements 40 release from the dough after cutting the dough.

It will be appreciated that the interior sidewall angle 72 is greater than the exterior sidewall angle 52. In various embodiments, the interior sidewall angle 72 can be greater than the exterior sidewall angle 52 by about 5° or more, or by about 10° or more, or by about 15° or more, or by about 20° or more. In some instances, the exterior sidewall angle 52 ranges from about 5° to about 15° or from about 7° to about 13°, or about 8° to about 10°, or about 9.5°. In some instances, the interior sidewall angle 72 ranges from about 15° to about 35°, or from about 20° to about 30°, or about 25°.

Turning back to FIG. 4, the interior sidewall 70 is provided with a shoulder 80 that is disposed between the top surface 62 and the top surface of the cutting surface 34. The shoulder 80 interrupts the interior sidewall 70 so that the interior sidewall 70 does not extend to the top wall 60. Instead, the shoulder 80 is provided with a sidewall 84 that extends from a base of the shoulder 82 to the top 60 at a shoulder sidewall angle 86. Referring to FIG. 5, the shoulder sidewall angle 86 is the angle between the shoulder sidewall angle 86 and an imaginary line 89 that is normal to the top of the cutting surface 34.

In some aspects the shoulder sidewall angle 86 may be the same or substantially the same as the interior sidewall angle 72. In other aspects the shoulder sidewall angle 86 differs from the interior sidewall angle 72. In various embodiments, the interior sidewall angle 72 can be greater than the shoulder sidewall angle 86 by about 5° or more, or by about 10° or more, or by about 15° or more, or by about 20° or more. In one aspect, the shoulder sidewall angle 86 ranges from about 8° to about 12°, or about 9° to about 11° and in some instances is about 10.5°.

The base of the shoulder 82 has a width 83 that is larger than the width of the top 64. In some instances the width of the shoulder 83 is about 1.2 to about 2.0 times larger than the width of the top 64, or about 1.4 to about 1.6 times or about 1.5 times larger than the width of the top 64. The shoulder width 83 ranges from about 0.4 to about 0.8 mm, or about 0.5 mm to about 0.7 mm, or about 0.6 mm.

In addition, the shoulder has a height 88 that is the height as measured from the shoulder base 82 to the top flat surface 62. The shoulder height 88 is less than the cutting element height 66. In some instances, the shoulder height 88 is about 15% to about 30% of the cutting element height 66. In some aspects, the shoulder height 88 is about 0.3 mm to about 1.3 mm, or about 0.5 mm to about 1.1 mm, or about 0.7 mm to about 0.9 mm, or about 0.8 mm.

As best seen in FIG. 5, the combination of the exterior sidewall angle 52 and the shoulder sidewall angle 86 define a cutting angle 100. In some instances, the cutting angle 100 ranges from about 5° to about 35°, or about 10° to about 30°, or about 15° to about 25°, or about 20°. Desirably the cutting angle 100 is small to effectively cut the dough and in some instances, the cutting angle 100 is smaller than the release angle.

Advantageously, by providing the above described cutting elements, substantially similar dough pieces 18 can be produced without creating an undesirable amount of waste.

While the concepts of the present disclosure are susceptible of various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. An apparatus comprising:
a cutting surface having a plurality of cutting elements with each cutting element comprising:
a top with a flat surface with a width;
an interior sidewall extending from a base of the cutting element to the top with an interior sidewall angle;
an exterior sidewall extending from the base of the cutting element to the top with an exterior sidewall angle, wherein a portion of the exterior sidewall of one of the plurality of cutting elements touches a portion of the exterior sidewall of an adjacent one of the plurality of cutting elements and wherein an interstitial gap is located between one of the plurality of the cutting elements and an adjacent one of the plurality of the cutting elements; and
a shoulder provided on the interior sidewall between the base of the cutting element and the top, the shoulder having (i) a base substantially parallel to the base of the cutting element, (ii) a width that is greater than the width of the top flat surface, and (iii) a shoulder sidewall being angled with respect to an imaginary line normal to the top ranging from about 8° to about 12°;
wherein the interior sidewall angle is greater than the exterior sidewall angle and greater than the shoulder sidewall angle by about 5° or more.

2. The apparatus of claim 1 wherein the interior sidewall angle ranges from about 15° to about 35°.

3. The apparatus of claim 1 wherein the exterior sidewall angle is about 5° to about 15°.

4. The apparatus of claim 1 wherein the width of the shoulder is about 1.5 times or greater than the width of the top flat surface.

5. The apparatus of claim 1 wherein the shoulder has a height measured from a shoulder base to the top that is less than a height of the top measured from the top to the cutting surface.

6. The apparatus of claim 5 wherein the shoulder height is between about 20% to about 40% of the height of the top surface.

7. The apparatus of claim 1 wherein the at least one cutting element is an ellipse.

8. The apparatus of claim 7 wherein all the cutting elements are elliptical.

9. The apparatus of claim 8 wherein all the cutting elements have a size that is equal.

10. The apparatus of claim 9 wherein each ellipse has a major axis that is between about 1.5 to about 2.0 times longer than a minor axis.

11. The apparatus of claim 1 wherein a portion of the exterior sidewall of one of the plurality of cutting elements touches a portion of the exterior sidewall of at least four adjacent one of the plurality of cutting elements.

12. The apparatus of claim 11 wherein a portion of the exterior sidewall of one of the plurality of cutting elements touches a portion of the exterior sidewall of six adjacent one of the plurality of cutting elements.

13. The apparatus of claim 1 wherein the apparatus comprises a roll with the cutting surface provided on an outer peripheral surface of the roll.

* * * * *